United States Patent [19]

Post

[11] 4,084,286
[45] Apr. 18, 1978

[54] SELF-MOISTENING CLEANING DEVICE

[76] Inventor: Herman D. Post, 7 Chester Dr., Great Neck, N.Y. 11021

[21] Appl. No.: 675,190

[22] Filed: Apr. 8, 1976

[51] Int. Cl.$^2$ ............................................. B08B 9/00
[52] U.S. Cl. .................................... 15/104.93; 274/47
[58] Field of Search ............ 15/104.92, 104.93, 104.94; 274/47; 206/361

[56] References Cited

U.S. PATENT DOCUMENTS

| | | | |
|---|---|---|---|
| 2,692,675 | 10/1964 | Land | 206/361 |
| 2,958,886 | 11/1960 | Taylor | 15/104.92 |
| 2,977,127 | 3/1961 | Mertes | 274/47 |
| 3,485,502 | 12/1969 | Thornton | 15/104.93 X |

*Primary Examiner*—Edward J. McCarthy
*Attorney, Agent, or Firm*—Michael J. Striker

[57] ABSTRACT

A self-moistening cleaning device, particularly for use in cleaning phonograph records and similar objects, comprises an air-tightly closable receptacle in which a cleaning body is normally accommodated. The atmosphere inside the receptacle is saturated with vapor of a cleaning liquid so that the cleaning body is controlledly moistened with the cleaning liquid in readiness for use in cleaning an object. A porous body, such as a sponge, can be saturated with the cleaning liquid and accommodated in the receptacle so that the cleaning liquid evaporates from the porous body and saturates the atmosphere in the receptacle with vapor. The cleaning body includes a layer of moisture-accepting material, such as velvet, which becomes moistened by the cleaning liquid and is subsequently used for cleaning the object to be cleaned. A method of using the cleaning body is also discussed.

9 Claims, 2 Drawing Figures

U.S. Patent      April 18, 1978      4,084,286
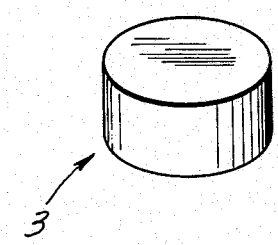
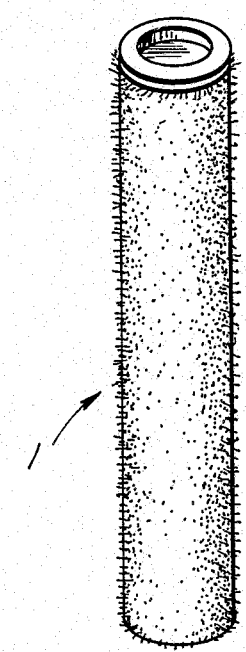
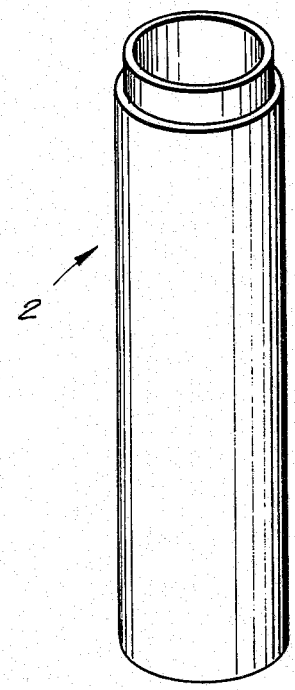
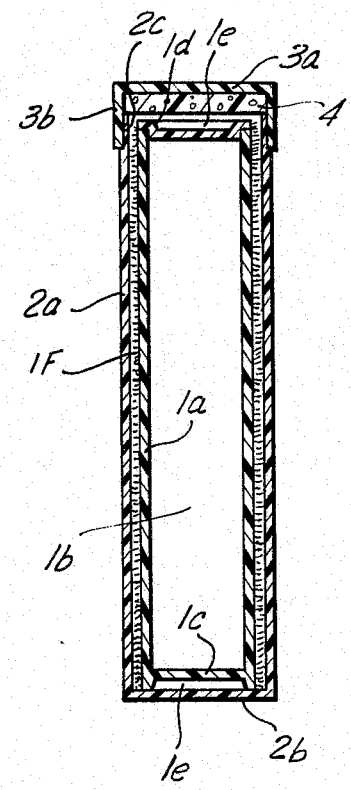
FIG. 1
FIG. 2

& #

SELF-MOISTENING CLEANING DEVICE

BACKGROUND OF THE INVENTION

The present invention relates to a cleaning device in general, and particularly to a cleaning device for cleaning phonograph records and similar objects.

There are already known various constructions of cleaning devices for use in cleaning phonograph records and similar objects, such devices being either permanent attachments of the record player, in which event the phonograph record may be cleaned during each playing thereof, or such devices may be separate units which are applied to the phonograph record only from time to time so as to remove accumulated dirt and dust therefrom. In the latter case, the cleaning device may be applied to the phonograph record when the latter is supported on the turntable of the record player, and possibly rotated, or the cleaning operation may be performed without resorting to the use of the record player for supporting the phonograph record.

In all of the heretofore known cleaning devices of the latter type, that is devices which are applied to the phonograph record only at intervals, the cleaning device, whatever configuration it may have, is thoroughly wetted by a cleaning agent or solvent when such a device is used for wet cleaning of the phonograph record. This wetting may be achieved either by immersing the cleaning device into a body of the cleaning liquid, by pouring the cleaning liquid over the cleaning device, or by contacting the cleaning body with a sponge, cloth or a similar porous body soaked in the cleaning agent.

The disadvantage inherent to such cleaning devices known to the prior art is that they do not provide for controlled wetting of the cleaning body. Therefore, the cleaning body will usually contain an excess amount of moisture which may drip off the cleaning body and soil the environment. However, even in the event that the moistening or wetting takes place by contacting the cleaning body with the sponge or cloth soaked in the cleaning agent, which may avoid the problem of dripping, an excessive amount of moisture will be present in the cleaning body, so that too much of the cleaning agent will become deposited on the phonograph record during the cleaning operation and particularly in the record grooves provided on the two faces of the phonograph record. This, of course, is very disadvantageous, not only because of the fact that more than the necessary amount of the cleaning agent is needed for cleaning the phonograph record, but especially because of the fact that the quality of reproduction suffers due to the presence of the cleaning agent, or the residue remaining after the evaporation of the cleaning agent, in the grooves of the phonograph record.

SUMMARY OF THE INVENTION

Accordingly, it is a general object of the present invention to avoid the disadvantages of the cleaning devices known to the prior art.

More particularly, it is an object of the present invention to provide a cleaning device particularly suited for cleaning phonograph records and similar objects, which is simple in construction and reliable in operation.

It is another object of the present invention to provide a cleaning device in which the cleaning body is not excessively moist.

It is a concomitant object of the present invention to provide a method of cleaning phonograph records and similar objects which assures superior performance and longevity of the phonograph record.

Still another object of the present invention is to provide a method of cleaning phonograph records in which the possibility of depositing large amounts of a cleaning agent in the grooves of the phonograph record is avoided.

In pursuance of these objects and others which will become apparent hereafter, one feature of the present invention resides, briefly stated, in a self-moistening cleaning device, particularly for cleaning phonograph records and similar objects, which device comprises, in combination, a receptacle having a chamber; means for closing the chamber; a cleaning body normally accommodated in the chamber and exposable to ambient atmosphere when it is desired to use the body to clean an object; and means for saturating the atmosphere in the chamber with vapor of a cleaning liquid to thereby controlledly moisten the cleaning body with the cleaning liquid in readiness for use in cleaning an object.

In a currently preferred embodiment of the present invention, the receptacle is of a tubular configuration and has an open and a closed end. the above-mentioned closing means of this embodiment includes a cover which is detachably mounted at the open end of the receptacle.

It is also current preferred to construct the cleaning body with a substantially tubular configuration, and to provide a layer of moisture-accepting material at least at the circumferential surface of the body. The material may be fibrous, and the fibers may extend substantially radially outwardly of the cleaning body. More particularly, it is proposed according to the present invention to construct the cleaning body with a rigid support portion which has a support surface, and to connect a moisture-accepting layer to the support surface.

The saturating means, as currently preferred, includes a porous body in the chamber, the porous body being soaked with the cleaning liquid. Preferably, the porous body is of a sponge-like consistency. The porous body may be located in the chamber either at the closed end of the receptacle, or at the open end thereof, in the latter case preferably in the cover. However, it is also possible to accommodate the porous body in the interior of the cleaning body, and provide at least one orifice which communicates the interior of the cleaning body with the exterior thereof so as to allow the vapors of the cleaning liquid to escape from the porous substance or body in the interior of the cleaning body and saturate the atmosphere surrounding the exterior of the cleaning body.

A method which is proposed by the present invention for cleaning phonograph records and similar objects comprises the steps of normally accommodating a cleaning body in an enclosed space; maintaining an atmosphere of cleaning agent vapors in the enclosed space about the cleaning body so as to controlledly moisten the cleaning body; exposing the moist cleaning body to ambient atmosphere when it is desired to use the body for cleaning purposes; and applying the moist cleaning body to an object to be cleaned.

The exposing step may include withdrawing the cleaning body from the enclosed space prior to the applying step, and the maintaining step may include accommodating a moisture-retaining substance in the enclosed space, and soaking the substance with the cleaning agent. In this manner, the vapor of the cleaning agent which evaporates from the moisture-retaining substance will maintain the atmosphere in the enclosed space about the cleaning body at or close to the saturation level so that the cleaning body will be controlledly moistened.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is an exploded view of the cleaning device of the present invention; and

FIG. 2 is a longitudinal sectional view of the device of FIG. 1 prior to cleaning an object.

DETAILED DISCUSSION OF THE PREFERRED EMBODIMENTS

Referring now to the drawing, and first to FIG. 1 thereof, it may be seen that the self-moistening cleaning device of the present invention includes a cleaning body 1, a receptacle 2 which is hollow and of such dimensions as to be able to accommodate the cleaning body 1, and a cover 3 which fits over the open end portion of the receptacle 2 so as to air-tightly separate the interior of the receptacle 2 from the exterior thereof.

The cleaning device of the present invention is shown in more detail and in its assembled position in FIG. 2, from where it may be seen that the cleaning body 1 has a substantially cylindrical wall portion 1a which circumferentially bounds an enclosed space 1b. The cleaning body 1 further has two end walls 1c and 1d, the end wall 1c being shown as being integral with the circumferential wall 1a, the end wall 1d being illustrated as being a discrete element which is received at an open end of circumferential wall 1a with pressure fit. However, the end wall 1c could also be a separate element also pressure fitted at the end of the circumferential wall 1a. Also, under certain circumstances, one or both of the end walls 1c and 1d could be omitted. The end walls 1c and 1d may be formed with depressions 1e which contribute to lightweight construction of the cleaning body 1.

A layer of moisture-accepting material 1f is aplied to the external surface of the circumferential wall 1a by conventional means. Such as by using an adhesive which is resistant to a cleaning fluid with which the moisture-accepting material 1f is to be moistened. The material 1f may be fibrous, such as, for instance, velvet. The material 1f may be applied to the entire external surface of the circumferential wall 1a, or only to a portion thereof, and may also cover one or both of the end walls 1c and 1d.

The cleaning body 1 may be, for example, 4 inches long and about ¾ inch in diameter so that it can be readily grasped by the user thereof either in the palm of his hand or between his fingers. The cleaning body 1, when used for cleaning phonograph records, is moved over the surface of the phonograph record generally in the direction of the grooves so as to remove dirt and dust therefrom. This can be achieved, for instance, by positioning the phonograph record on a turntable of a record player and by holding the cleaning body 1 in steady contact with the phonograph record while the turntable rotates the record. However, it is also possible to clean the phonograph record without resorting to the help of the turntable of a record player by simply holding the phonograph record in one hand while holding the cleaning body 1 in the other hand and moving the latter with respect to the former.

The cleaning body 1, when not in use for cleaning an object, is accommodated in the receptacle 2 with spacing therefrom. The receptacle 2 has a circumferential wall 2a and a closing end wall 2b which together bound a space in which the cleaning body 1 is accommodated. The circumferential wall 2a has an open portion 2c which may be internally recessed.

The cover 3 has a transverse wall 3a of substantially circular configuration, and a hollow cylindrical wall 3b which extends substantially normal to the transverse wall 3a. The wall 3b cooperates with the open end portion 2c of the wall 2a, in the recessed region thereof, to airtightly separate the interior of the receptacle 2 from the exterior thereof.

When the cleaning body 1, and particularly the material 1f thereof, is to be moistened with the cleaning liquid, the cleaning liquid is introduced to the receptacle 2, the cleaning body 1 is accommodated therein, and the cover 3 is slipped over the open end portion 2c of the receptacle 2 so as to seal the same. The cleaning liquid evaporates in the enclosed space defined by the receptacle 2 and the cover 3 and moistens the material 1f of the cleaning body. Thus, when the cleaning body 1 is withdrawn from the receptacle 2 for the purpose of cleaning a phonograph record or a similar object therewith, the material 1f is controlledly moistened with the cleaning liquid with the vapor of which it came into contact while accommodated in the receptacle 2.

The cleaning liquid may be introduced into the receptacle 2 in form of droplets or spray just prior to the accommodation of the cleaning body 1 in the receptacle 2. However, it is also possible as illustrated in FIG. 2 to provide a porous body 4, which may be of a sponge-like consistency, in the interior of the closed receptacle 2. In the illustrated embodiment, the porous body 4 is provided in the cover 3, but it is equally possible to locate the porous body 4 at the end wall 2b of the receptacle 2. The porous body 4 may be soaked with the cleaning liquid so that the latter evaporates therefrom and saturates the atmosphere inside the closed receptacle 2 around the cleaning body 1. In this manner, a large supply of the cleaning liquid may be maintained inside the closed receptacle 2 without running the risk that the material 1f will become excessively wet from direct contact with the cleaning liquid.

Another possibility also contemplated by the present invention is to provide the porous body 4 in the interior 1b of the cleaning body 1. In that event, one or both of the end walls 1c and 1d may either be perforated or omitted altogether so as to provide an escape route for the vapors of the cleaning liquid from the interior 1d of the cleaning body 1 to the exterior thereof and particularly adjacent and around the material 1f. Under certain circumstances, it may also be advantageous to directly pour the cleaning liquid into the interior 1b of the cleaning body 1, without providing the porous body 4 therein, through an appropriate opening in one of the end walls 1c and 1d of the cleaning body 1. However, under such circumstances care must be taken that the cleaning liquid received in the interior 1b of the cleaning body 1 is not spilled during the use of the cleaning body 1 for cleaning an object, such as a phonograph record.

It will be understood that each of the elements described above, or two or more together, may also find a useful application in other types of constructions differing from the types described above.

While the invention has been illustrated and described as embodied in a self-moistening cleaning device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A self-moistening cleaning device, particularly for cleaning phonograph records and similar objects, comprising, in combination, a receptacle having a chamber; means for closing said chamber; a cleaning body normally accommodated in said chamber and exposable to ambient atmosphere when it is desired to use said cleaning body to clean an object, said cleaning body having an outer circumferential surface and a layer of moisture-accepting material provided on and covering at least said outer circumferential surface; and means for controlledly moistening said layer of said cleaning body with a cleaning liquid in readiness for use of said cleaning body for cleaning an object, including means for confining a quantity of the cleaning liquid in said chamber, at least when said cleaning body is accommodated therein and said closing means closes said chamber, at a location remote from said layer of said cleaning body, for the cleaning liquid to evaporate and saturate the atmosphere in said chamber with a vapor of the cleaning liquid which penetrates into said layer of said cleaning body and thus controlledly moistens the same.

2. A combination as defined in claim 1, wherein said receptacle is of a tubular configuration and has an open and a closed end; and wherein said closing means includes a cover detachably mounted at said open end of said receptacle.

3. A combination as defined in claim 1, wherein said cleaning body is of a tubular configuration.

4. A combination as defined in claim 1, wherein said material is fibrous.

5. A combination as defined in claim 1, wherein said material has fibers which extend outwardly of said cleaning body.

6. A combination as defined in claim 1, wherein said confining means includes a porous body in said chamber, which is soaked with the cleaning liquid.

7. A combination as defined in claim 6, wherein said porous body is of sponge-like consistency.

8. A combination as defined in claim 6, wherein said receptacle has an open side, and said closing means includes a cover detachably mounted on said receptacle at said open side; and wherein said porous body is attached to one of said receptacle and said cover.

9. A combination as defined in claim 1, wherein said cleaning body includes a rigid support portion having a support surface, and a moisture-accepting portion connected to said support surface.

* * * * *